US009417005B1

(12) United States Patent
Roth et al.

(10) Patent No.: US 9,417,005 B1
(45) Date of Patent: Aug. 16, 2016

(54) RETROFIT DEVICE AND METHOD TO IMPROVE HUMIDITY CONTROL OF VAPOR COMPRESSION COOLING SYSTEMS

(75) Inventors: Robert Paul Roth, Melbourne, FL (US); David C. Hahn, Rockledge, FL (US); Robert P. Scaringe, Rockledge, FL (US)

(73) Assignee: Mainstream Engineering Corporation, Rockledge, FL (US)

(*) Notice: Subject to any disclaimer, the term of this patent is extended or adjusted under 35 U.S.C. 154(b) by 96 days.

(21) Appl. No.: 13/548,828

(22) Filed: Jul. 13, 2012

(51) Int. Cl.
*F25D 17/06* (2006.01)

(52) U.S. Cl.
CPC .................................. *F25D 17/06* (2013.01)

(58) Field of Classification Search
CPC ........... F25B 2600/112; F25B 2700/02; F25B 2700/173; F25B 2700/21171; F24F 2011/0076; F24F 11/0079; F24F 11/0008; F24F 11/0015; G05D 22/00; G05D 22/02
USPC .................. 62/93, 186, 216, 176.1, 176.6
See application file for complete search history.

(56) References Cited

U.S. PATENT DOCUMENTS

| | | | | |
|---|---|---|---|---|
| 4,271,898 A * | 6/1981 | Freeman | ............... | G05D 23/275 165/250 |
| 4,735,054 A * | 4/1988 | Beckey | ................. | F24F 11/085 62/176.1 |
| 5,062,276 A * | 11/1991 | Dudley | .................. | F24F 11/00 62/176.6 |
| 5,303,561 A * | 4/1994 | Bahel | ..................... | F24F 1/0003 62/160 |
| 5,353,862 A * | 10/1994 | Akiyama | .................. | F24F 3/14 165/229 |
| 5,355,323 A * | 10/1994 | Bae | ....................... | F24F 3/1405 236/44 C |
| 5,381,669 A * | 1/1995 | Bahel | ..................... | F25B 49/005 62/129 |
| 5,428,964 A * | 7/1995 | Lobdell | ............... | F24F 11/0009 236/44 C |
| 5,533,352 A * | 7/1996 | Bahel | .................. | F24F 11/0009 62/180 |
| 5,611,211 A * | 3/1997 | Whipple, III | ........... | F25B 45/00 62/149 |
| 6,070,110 A * | 5/2000 | Shah | ................... | F24F 11/0008 165/205 |
| 6,220,039 B1 * | 4/2001 | Kensok | ............... | F24F 11/0008 126/113 |
| 6,282,910 B1 | 9/2001 | Helt | | |
| 6,487,868 B2 * | 12/2002 | Sato | ...................... | F24F 1/0007 422/124 |
| 6,826,920 B2 * | 12/2004 | Wacker | .................... | F24F 3/153 236/44 A |
| 6,996,999 B2 * | 2/2006 | Wacker | .................. | G05D 22/02 165/225 |
| 7,191,607 B2 | 3/2007 | Curtis | | |
| 7,228,693 B2 * | 6/2007 | Helt | ...................... | F24F 11/001 236/15 R |
| 7,266,960 B2 * | 9/2007 | Shah | ................... | F24F 11/0008 236/44 C |
| 7,739,882 B2 | 6/2010 | Evans et al. | | |
| 7,946,123 B2 | 5/2011 | Tolbert, Jr. et al. | | |
| 8,544,288 B2 * | 10/2013 | MacDonald | .......... | F24F 3/1405 236/44 A |
| 2004/0099411 A1 * | 5/2004 | Kensok | ..................... | F24F 3/14 165/230 |
| 2007/0261422 A1 * | 11/2007 | Crawford | ............ | F24F 11/0008 62/176.1 |
| 2008/0066477 A1 * | 3/2008 | Aoki | .................. | B60H 1/00785 62/150 |
| 2008/0078842 A1 * | 4/2008 | MacDonald | .......... | F24F 3/1405 236/44 R |
| 2010/0236262 A1 * | 9/2010 | Lifson | ................... | F24F 3/1405 62/89 |
| 2011/0088455 A1 * | 4/2011 | Takagi | ............... | F24F 11/0015 73/29.02 |

* cited by examiner

Primary Examiner — Cassey D Bauer
Assistant Examiner — Kirstin Oswald

(57) ABSTRACT

A method and device for improving moisture removal capacity of a vapor compression system is disclosed. The vapor compression system is started up with the evaporator blower initially set to a high speed. A relative humidity in a return air stream is measured with the evaporator blower operating at the high speed. If the measured humidity is above the predetermined high relative humidity value, the evaporator blower speed is reduced from the initially set high speed to the lowest possible speed. The device is a control board connected with the blower and uses a predetermined change in measured relative humidity to control the blower motor speed.

4 Claims, 4 Drawing Sheets

RETROFIT DEVICE AND METHOD TO IMPROVE HUMIDITY CONTROL OF VAPOR COMPRESSION COOLING SYSTEMS

GOVERNMENT LICENSE RIGHTS

The U.S. Government has paid-up license in this invention and the right in limited circumstances to require the patent owner to license others on reasonable terms as may be provided for by the terms of Contract No. DE-SC-000-3289 awarded by the U.S. Department of Energy.

CROSS-REFERENCE TO RELATED APPLICATION

This application is related to application Ser. No. 13/538,441 filed Jun. 29, 2012, by Robert Paul Roth et al and entitled "Retrofit Device and Method to Improve Vapor Compression System Performance by Dynamic Blower Speed Modulation".

BACKGROUND AND SUMMARY OF THE INVENTION

The present invention relates generally to a simple and low-cost electronic control to improve the humidity removal capability of fixed speed air conditioners and heat pumps operating in cooling mode, using the existing blower motor and without the need to install a variable speed drive, or complex control and sensor logic.

It is well known in the art that slowing down the rotational speed of an evaporator blower of a vapor-compression cooling system (thereby reducing the air flow) will lead to lower evaporator temperatures and improved humidly removal and that increasing the speed of the evaporator blower (thereby increasing the air flow rate), will lead to an increase in the evaporator temperature and therefore higher efficiencies. It is this principle that is used in more expensive and higher efficiency air conditioners and heat pumps that are fitted with variable speed blowers. Thermodynamically, an increase in the Coefficient of Performance in cooling (referred to as COPc), will occur if the evaporator temperature is increased (for a constant condensation temperature). The COPc is the cooling capacity at a particular operating condition (indoor and outdoor temperatures and humilities) divided by the power consumption at those conditions. Likewise, the lower the temperature of the evaporator coil, the greater the dehumidification and moisture removal.

The basic concept that the higher the evaporator temperature, the greater the performance, goes all the way back to the fundamental Carnot cycle and the basic principles of thermodynamics. There are numerous references to this well-known fact, such as U.S. Pat. No. 5,303,561 which states in column 2, lines 13-15 which states "this is due to the fact that a highly efficient air-conditioning system nominally operates at higher evaporator coil temperature . . . " That patent proposes the use of a continually variable blower motor to modulate the blower speed using a "integrated drive and variable speed motor" (col. 6, lines 21-22), and this approach in one form or another is used along with complex control logic to establish the optimal blower speed for the desired temperature and humidity in the building. This known system uses a combination of indoor air temperature, indoor humidity and outdoor air temperature for selecting the speed of the indoor evaporator blower motor.

Likewise U.S. Pat. No. 6,282,910 discusses using an AC induction blower motor along with a variable speed drive, where for full speed operation the alternating current power is directly coupled to the motor at nominal line frequency and bypasses the inverter, while for reduced speed operation, the output of the inverter is used to reduce the speed of the blower. This patent also discusses the benefit of reduced air flow for reducing the humidity (see col. 5, lines 5-8). However, while using the existing alternating current (AC) induction motor, this known approach uses a continuously variable speed drive inverter to vary the speed of the blower motor.

Others have proposed to modulate the compressor speed, such as disclosed in U.S. Pat. No. 7,946,123, but these methods also require variable speed drive inverters or different compressors to implement in a retrofit configuration and are thus costly and impractical for retrofit applications. Likewise, U.S. Pat. No. 7,739,882 discloses a variable speed control system for use with a variable speed compressor.

U.S. Pat. No. 7,191,607 discusses a speed control that selectively operates the fixed speed blower motor to slow the speed of the blower for dehumidification. However, this capability is used to slow the speed of the blower motor only in the initial stages of the cooling mode, typically the first 5 to 7 minutes. While a humidistat for the detection of humidity is proposed, this humidity measuring device is used with a motorized outside damper and is not used to adjust the speed of the evaporator blower motor. This is a much more expensive and complex approach because it requires the use of an outdoor air supply adjusted by a motorized damper which is controlled by a humidistat. Furthermore, nothing is suggested about decreasing the speed of the blower in response to feedback from a humidity sensor or humidistat, even though the system of the '607 patent uses a humidistat. The humidistat shown in the FIG. 4 of that patent shows the humidistat in series electrically with the circuit to provide damper control of outside air introduction. There is no teaching of operating the blower at maximum speed initially, while waiting a delay period, so as to obtain an better mixed air humidity reading from the humidity sensor, prior to making any decisions based on the humidity readings of the sensor. Col. 4, line 63 through col. 5, line 1, of that patent states that: "the time delay circuit 48 is programmed so that the speed controller 46 runs the blower 38 al first, lower speed for a predetermined 'delay' period once the blower 38 is first turned on at the beginning of an air conditioning cycle. When the delay period elapses the blower 38 is run at the second, higher speed for the remainder of the cycle." In other words, the blower operates at an initial slow speed, regardless of the sensory output of the humidistat, for a delay period of time and then operates at a second higher speed thereafter, regardless of the sensor readings from the humidistat.

As is well known in the art; blower motors used in many air conditioning and heat pump systems typically utilize fixed speed blowers with a ability to manually select one of many multi-speed taps on the blower motor, while the more expensive and higher performance air conditioners and heat pumps many times use Electronically Commutated Motors (ECM) that can be used to provide continuously variable speed control to maximize the COPc. In addition to our realization that we can use any type of multi-speed-tap motor along with the invention described in our related patent application (Ser. No. 13/538,441 filed Jun. 29, 2012, by Robert Paul Roth et al and entitled "Retrofit Device and Method to Improve Vapor Compression System Performance by Dynamic Blower Speed Modulation") to improve COPc at a much lower cost, we have also realized that we can use the variable speed taps of these low-cost blower motor to improve humidity removal rate from the conditioned air when necessary. And do so with an inexpensive and easy to retrofit approach.

We have realized that instead of using the more expensive continuously variable speed blowers to achieve variable speed humidity control by incorporating a humidistat, also referred to as a humidity sensor, to provide some type of continuous speed variation of the variable speed ECM motor, we are simply using the slowest possible fixed speed. of the low cost multiple speed tap motor when the feedback from the humidity sensor or humidity switch indicates high humidity (at or above a high humidity threshold), and some other speed when the humidity is not above the high humidity threshold. The other speed can be manually selected by the technician installing or servicing the air conditioning or in our preferred embodiment the other speed can be selected by a control logic that will maximize performance when humidity is not an issue.

We have also realized that, to obtain the best humidity reading by the humidity sensor or switch located in the return air flow section of the indoor air handling unit of the air of the conditioner, the low-cost multiple speed tap blower motor should be operated at the highest speed possible for an initial delay period and then take the humidity reading before any blower motor speed changes are made.

It is well known in the art that the lower-cost multiple speed tap motors are normally used as a fixed-speed blower, where the multiple different winding combinations (different speed taps), allow the air conditioning installer or maintainer to select from an assortment of fixed speeds from the same evaporator blower motor (depending on the wiretap that is activated) to best balance the air flow for a particular installation. In a conventional application, once the speed is selected, the evaporator blower operates at this speed setting whenever the motor is activated. The installer typically has the option of selecting low, medium, or high speed for the blower's operation, while some blower motors even have five or more speed selections. Once selected, typically by placing a power-lead on a low, medium or high speed tap on the motor, the evaporator blower speed will then operate at this speed whenever it is powered on. The present invention uses the same multi-speed taps to provide dynamic variable speed adjustments, based on the humidity in the conditioned structure, as determined by the humidity of the air being returned to the suction side of the evaporator blower assembly. It is also common for the installer or maintainer to select a different speed tap for furnace heating when compared to cooling by the air conditioner.

The present invention uses the exact opposite control logic on startup of that used in the system disclosed in the above-mentioned U.S. Pat. No. 7,191,607. That is, in the present invention, when the air conditioner is started and the evaporator blower is activated, the blower motor speed is set to the maximum speed for the initial startup rather than the slow speed. We have found that this approach more effectively circulates the air in the structure, so that a more accurate humidity measurement at the inlet to the blower can be measured. The humidity is detected by a humidity sensor either located directly on the control board of the invention or remotely via a short cable to allow the humidity sensor to be placed in the return airflow.

The present invention is elegant in its simplicity and its ability to provide dramatic improvements in moisture removal when the air conditioner or heat pump is operating in cooling mode. Furthermore, it provides this humidity reduction, without any need to replace the existing thermostat based control system, the existing evaporator blower motor, to or add any complex, costly and large inverter or other speed controller system. Due to its simplicity, it can easily and quickly retrofitted into exiting air conditioning and heat pump cooling systems, even when a separate heating system is present. No additional control wiring needs to be used and the humidity sensor is wired to only the control board of the present invention. For systems where the air conditioner or heat pump is coupled with a furnace, that is the evaporator is located in the furnace assembly and the same blower motor operates for furnace heating and vapor compression (AC or heat pump) operation, a separate blower motor power lead for heating operation is typically provided and the invention described herein is bypassed. However, when only a single set of power leads to the blower are provided for both heating and cooling, the present invention can still be successfully utilized without modification even though invention receives power only from the leads supplying the blower motor and is not in any other way connected to the control system or thermostat without additional sensors or devices, and therefore does not know if the heating or cooling capability is being utilized. When the blower motor is operating to deliver heated air into the conditioned space, and the return air is of high humidity (above the HSP threshold), the control board of the present invention will lower the air flow and thereby increase the temperature of the heated supply air. While not providing any actual moisture removal in this air heating situation, this is a favorable response, since humidity (i.e., dampness), lowers the occupant's comfort level, and supplying warmer air will mitigate this issue. Of course, it is also well known that while the specific humidity has not changed, that is, the mass of moisture in a mass of dry air has not changed, the relative humidity has decreased, due to the ability of warm air to hold more moisture relative to cold air, making the relative humidity decrease. Therefore, the simple control board of the present invention operates with only the humidity measurement and power from the blower motor leads and can be used without regard to when the blower motor is operating in cooling or heating.

Another benefit of our invention is the simple installation it affords, and the ability to use the existing blower motor, thermostat and control system which activates the cooling system.

BRIEF DESCRIPTION OF THE DRAWINGS

These and other features, objects and advantages of the present invention will become more readily apparent from the following detailed description thereof when taken in conjunction with the accompanying drawings wherein.

DETAILED DESCRIPTION OF THE DRAWINGS

Figure 1:
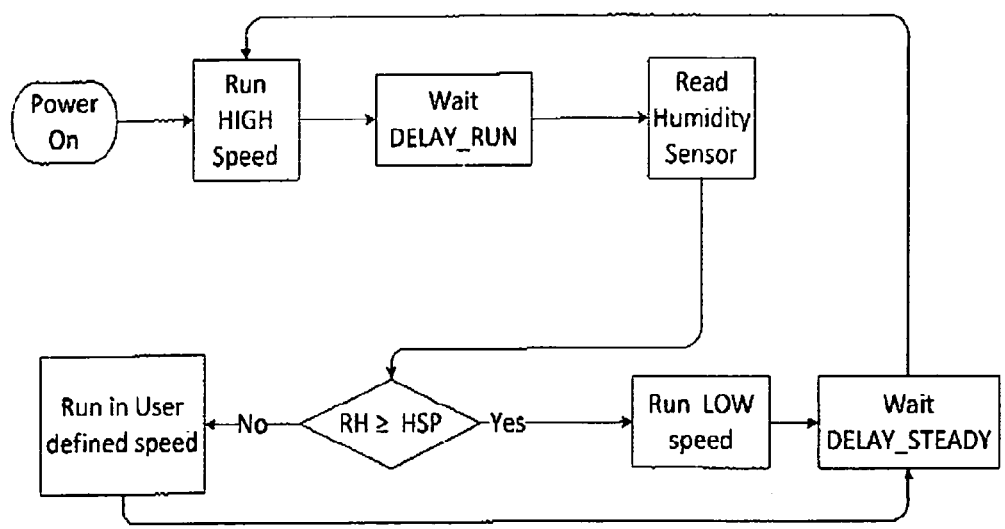
FIG. 1 is a flow chart showing the logic of an embodiment of the present invention which operates the blower motor at low speed after the humidity level is determined to be above a threshold value and to operate the blower at some speed, determined by any number of methods known in the art or disclosed by our related invention in the cross-referenced application, when the humidity is below the humidity threshold.

The present invention uses humidity control logic which can be located on a unique control board or incorporated onto a control board that has been developed to improve the performance of the vapor compression system by also varying blower motor speed. Using a single control board to include the inventive features of both humidity control and performance improvement will reduce the cost of the control board. The control board is located in the indoor air handler and the humidity sensor is located in the return air flow in the region near the evaporator blower (typically around the inlet of the blower). The installation is very simple namely; the two power leads (switched and common or also referred to as L1 and L2 comprised of a hot leg and neutral for 115 VAC single-phase operation or two hot legs for 230 VAC single-phase operation, as an example) to the blower are removed from the blower motor and attached to the control board. As many as six power leads, corresponding to five speeds and a common or as few as three power leads corresponding to a maximum and minimum blower motor speed and a common, are then connected to the different speed setting posts (speed taps) and the common on the evaporator blower motor. In the control board of a currently preferred embodiment, a High-Speed power lead is connected to the high-speed post of the multi-tap motor, a Medium-Speed power lead is connected to the medium-speed post of the multi-tap motor, a low-speed power lead is connected to the low speed post of the multi-tap motor and a common wire is connected to the common of the multi-tap motor. If more than three (3) speed taps are available, then the highest and lowest speed taps are connected to the high and low speed taps of the motor and the medium speed tap is connected to a speed tap reasonably located between the other two speeds. If only two speeds are available on the motor, then both the medium and low speed power leads are connected to the low speed tap. It is within the scope of the present invention to use even more speeds between the maximum and minimum speed settings. The currently preferred embodiment of the invention disclosed herein uses the lowest possible blower speed when the relative humidity is measured as high, that is when the measured relative humidity (RH) is greater than or equal to the (HSP) and allows a performance improving logic to determine the blower motor speed when the humidity is below the humidity set point (HSP).

The control board itself is only powered when power is supplied to the two power leads. That is, the remainder of the air conditioning system and the air conditioning control system is unchanged. When the thermostat on the air conditioning system calls for cooling, power is supplied to the compressor(s), the condenser fan(s) and the evaporator blower(s). The power is sent to the evaporator blower motor or motors via the aforementioned two power leads which are now connected to the control board and provide the power to the control board.

Referring to the logic of FIG. 1, the control logic initially operates the evaporator blower at full speed to allow the conditioned air the opportunity to adequately circulate throughout the structure. Electric power is sent to the evaporator blower motor power leads and activates the high speed power tap. After a short delay (DELAY_RUN), if the relative humidity (RH) measured in the return air stream and as determined by the humidity sensor is above or equal to the humidity set point (HSP) and the thermostat is still calling for the evaporator blower to operate (which is indicated by the power leads to the control board being energized), then the blower speed is changed to the slowest speed by removing power from the high-speed power tap and providing power to the low speed power tap. Otherwise, the blower speed is determined by other means. The blower motor is operated at the selected speed until the unit cycles off or after an elapsed running time of (DELAY_STEADY) when the humidity is once again rechecked.

Referring to the logic of FIG. 2, once again the control logic initially operates the evaporator blower at full speed to allow the conditioned air the opportunity to adequately circulate throughout the structure. Electrical power is sent to the evaporator blower motor power leads and activates the high speed power speed tap. After a short delay (DELAY_RUN), if the relative humidity (RH) measured in the return air stream and as determined by the humidity sensor is above or equal to the humidity set point (HSP) and the thermostat is still calling for the evaporator blower to operate, then the blower speed is changed to the slowest speed by removing power from the high-speed power tap and providing power to the low speed power tap. Otherwise, the blower speed is determined by the performance improving logic. The blower motor is operated at the selected speed until the unit cycles off or after an elapsed running time of (DELAY_STEADY) when the humidity is once again rechecked.

The time delay (DELAY_RUN) can be anywhere from 30 seconds to 10 minutes, but our currently preferred embodiment uses a 2-minute delay. The DELAY_STEADY can be anywhere between 6 minutes and 24 hours, but our currently preferred embodiment uses 3 hours. The relative humidity set point (HSP) can be anywhere from 25% to 99% relative humidity, but our currently preferred embodiment uses a 55% relative humidity. The time delays (DELAY_RUN and DELAY_STEADY) and relative humidity set point (HSP) can be permanently stored in the circuit board programming in a well-known manner. With this embodiment, no information needs to be stored when the control board is not being powered from the blower power leads. In the currently preferred embodiment using the logic of FIG. 2, upon blower motor startup, via power being supplied to the separate and distinct heat power lead (for furnace and similar applications that allow for a different blower speed in a non vapor-compression heat mode), the control board provides no active function. This heat power lead can be wired directly to the single preselected blower speed along with passing the common lead to the blower motor.

In all configurations, when the air conditioning unit is cycled off, no history is saved, and the unit again begins by providing power to the high speed power taps of the blower motor.

For a heat pump that supplies both heating and cooling, the discussion so far, has been concerned with the case where the heat pump is operating in cooling mode like an air conditioner. However, the present invention operates when power is being supplied to the indoor air handler blower motor, which is the evaporator blower when the heat pump is operating in cooling mode (air conditioning), and the same blower motor is the condenser blower motor when the heat pump is operating in heating mode. Power is received only from the leads supplying this motor and there is no other connection to the control system or thermostat needed. However, with the present invention, there is no need to determine whether the blower assembly is supplying air that is being cooled by the evaporator or supplying air that is being heated. Of course, an arrangement of temperature measuring devices or a connection to the thermostat wiring could be utilized to determine if the system was in heating or cooling mode; however, in our currently preferred embodiment, we are attempting to reduce cost and simplify installation as much as possible and have sought to reduce complexity.

In addition to reducing cost and complexity, we have found that there is yet another important reason why distinguishing between heating and cooling modes for heat pump systems is unnecessary. When the vapor compression system is operating in heating mode, if the air being supplied to the inlet section of the blower motor assembly (where the humidity measurement is taken) is of high humidity (which makes the occupant feel colder), the control board of the present invention will lower the air flow and thereby increase the temperature of the supply air for the system in heating mode. This is a favorable response, since humidity, i.e., dampness, lowers the occupant's comfort level, and supplying warmer air will mitigate this issue. It is to be noted that in heat pumps the supply air temperature is much cooler than a furnace, where the air is being heated by the combustion of fuel. Therefore, the simple control board of the present invention operates on only the onboard humidity measurement and power from the blower motor leads and can be used on either heat pumps or air conditioners.

If it is intended to defeat the variable speed operation of evaporator blowers that are part of a furnace system because reducing the speed of a furnace blower may not be desired, then one method is to deactivate the control board when the compressor of the vapor compression system is not activated, which would require monitoring the voltage on the compressor control wire (yellow wire) of the thermostat circuit.

If, on the other hand, it is intended to defeat the variable speed operation of the indoor blower (evaporator blower in cooling, condenser blower in heating) for heat pump systems, the reversing valve setting can be used to deactivate the system in heating mode by monitoring either the orange or brown control wires of the thermostat.

Finally the temperature change in the return air as the evaporator blower operates can if desired, be used to defeat the variable speed operating when in heating mode. That is, if the temperature is dropping, then the system is in cooling mode while if the temperature is increasing, then the system is in heat mode. Persons skilled in this art will know that various other methods are available to "wire around" the proposed invention when the system is in heating mode when desired. However, as pointed out, this is not required for the preferred embodiment of this invention.

Figure 3:
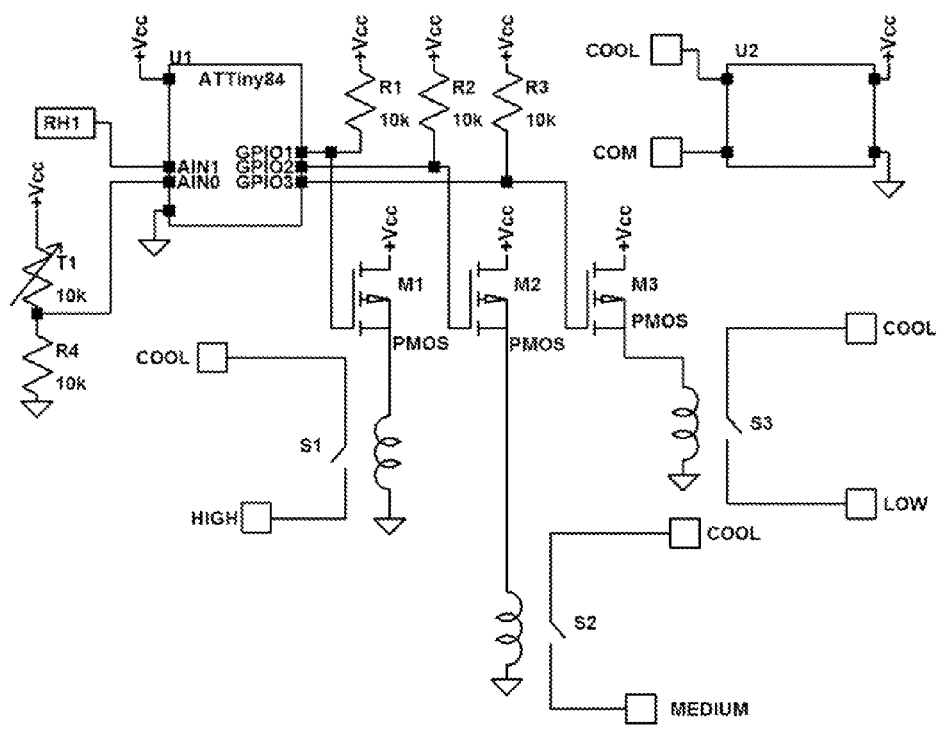
FIG. 3 is a schematic diagram of the humidity control circuitry and performance improving circuitry implemented onto a single circuit board and sharing common components to reduce the cost of the electronic circuit board while providing both functions of humidity control and performance improvement.

FIG. 3 shows the circuitry of the preferred embodiment of the current invention incorporated into the control board that also provides improved performance when the humidity reduction is not required. The electrical schematic of FIG. 3 is similar to the electrical schematic of FIG. 4 of our above cross-referenced related patent application, with the modification of a humidity sensor RH1. In the currently preferred embodiment, the humidity sensor to be used in is any analog humidity sensor, such as a Honeywell HIH-4030 humidity sensor, which outputs a 0-5V signal proportional to the measured humidity, or it may be a humidity switch that can open or close at a the threshold value of humidity (which in the preferred embodiment is 55%). The electronic controller board, including a core microprocessor element U1 (as shown in the preferred embodiment as a Freescale RS08 series microcontroller), a thermistor T1, relays S1, S2, and S3, relay driver circuitry components M1-M3, R1-R3, and a low voltage supply U2. A temperature sensor to be used can be selected from any one of commercially available resistance-based temperature sensors, such as a standard thermistor or resistance temperature detector (RTD), both of which change resistance proportional to the temperature of the element. The humidity sensor as in FIG. 3 as RH1 is a simple sensor capable of measuring relative humidity above or below the threshold relative humidity for determining whether to reduce humidity. A small microprocessor element U1 can be comprised of a simple 8-bit microcontroller that records temperature and humidity in the procedures as described above and uses the relays S1 through S3 to switch the input power to one of the speed legs of the blower motor during cooling operation (power being supplied to the input). P-channel MOSFETs M1, M2, M3 and resistors R1, R2, R3 interface between microcontroller U1 and relays S1, S2, S3. Supply U2 is a simple, conventional power supply device capable of interfacing between the line voltage on the Cool Mode power line and the logic level voltage needed to run the low voltage electronics.

Of course, one skilled in the art can make modifications to the board shown in FIG. 3. For example, one may replace resistor R4 with a Wheatstone bridge-style current loop measurement circuit for improved accuracy, or add an additional resistor and voltage regulator in series with the divider resistor. While shown in the currently preferred embodiment as driving the relays with high-side P channel MOSFETs M1, M2, M3, one of ordinary skill in the art may easily invert the driver circuit with low side N channel MOSFETs or some other basic switching element if desired. The microcontroller U1 could be changed to any other particular microcontroller depending on the designer's preference to achieve the same functionality. Likewise, the power supply U2 could be replaced with a wide number of different voltage regulation/conversion modules, or circuits for the same functional purpose of providing a logic-level voltage and power output to the controller.

Adding additional speeds is a minor modification for one skilled in the art by simply adding another switching relay and an additional input to the microprocessor and associated driver switch and resistor. If the system being retrofitted has more speed taps than there are microprocessor pins, a larger microprocessor can be used with a greater number of pins.

Referring again to FIG. 2, upon blower start up, via power being supplied to the cooling power lead, (which is sometimes the only power lead being used for a heat pump or air conditioner with electric heat for example), the blower motor initially starts on high speed, by supplying power (COOL Terminal Powered On) to the High-Speed power tap on the evaporator blower motor (indoor air handler). The evaporator blower operates at this speed (Run High Speed) until a predetermined time delay (DELAY_RUN) has occurred (or the unit cycles off). After the time delay (DELAY_RUN), if the unit is still operating, the relative humidity (RH) is measured and compared to the relative humidity set point (HSP). If the relative humidity is greater than or equal to the relative humidity set point (HSP) then the evaporator blower motor speed is changed to the low speed by removing power from the High-Speed tap and instead supplying power to the Low-Speed tap. The evaporator blower operates at low speed until a predetermined time delay (DELAY_RUN) has occurred (or the unit cycles off). After the time delay (DELAY_RUN), the humidity test is repeated.

Alternatively, if the relative humidity is less than the relative humidity set point (HSP) then control logic to maximize system performance by varying the blower motor speed should be implemented. For example, the evaporator coil surface temperature is recorded (Set PREV_TEMP=CURR_TEMP), and the indoor coil blower motor speed is reduced to the medium speed (Run in MEDIUM speed), by removing power from the High-Speed tap and instead supplying power to the Medium-Speed tap. The indoor blower motor operates at this speed until a predetermined time delay (DELAY_RUN) has occurred (or the unit cycles off). After the time delay (DELAY_RUN), if the unit is still operating, then the indoor coil surface temperature is recorded (CURR_TEMP). If the absolute temperature difference between the newly recorded temperature (CURR_TEMP) and the previous temperature (PREV_TEMP) is more than or equal to a predetermined amount (TEMP_DELTA), that is if the absolute value of difference of PREV_TEMP and CURR_TEMP is greater than or equal to TEMP_DELTA, then the indoor coil blower motor speed is increased back to the high speed (Run HIGH Speed), by removing power from the Medium-Speed tap and instead supplying power to the High-Speed tap. The unit operates at this high-speed until the unit cycles off. No information is saved when the unit cycles off. When the unit cycles back on, all comparisons are started all over again.

Figure 2:
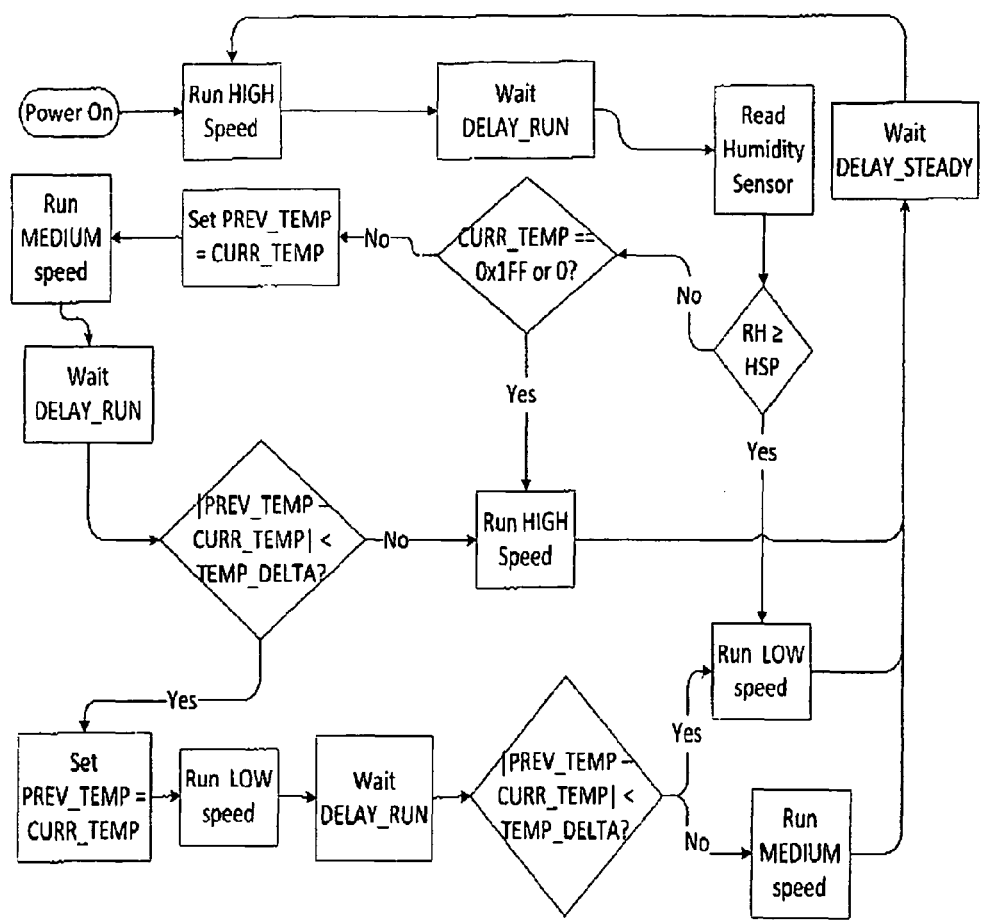
FIG. 2 is a schematic diagram of the humidity control logic implemented with a performance improving control logic to achieve humidity reduction when the humidity is high or performance improvement when the humidity is not high.

Alternatively in the FIG. 2 control logic, if the absolute value of the temperature difference is less than the allowable temperature difference (TEMP_DELTA), i.e., Absolute Value of (PREV_TEMP−CURR_TEMP) is less than TEMP_DELTA, then the newly recorded temperature (CURR_TEMP) is saved as the stored temperature (PREV_TEMP=CURR_TEMP) and the blower motor speed is reduced to the low speed (Run on Low Speed) by removing power from the Medium-Speed tap and instead supplying power to the Low-Speed tap. After the time delay (DELAY_RUN), if the unit is still operating, then the evaporator coil surface temperature is again recorded (CURR_TEMP). if the absolute value of the temperature difference between the newly recorded temperature (CURR_TEMP) and the previous temperature (PREV_TEMP) is more than (or equal to) the predetermined amount (TEMP_DELTA), then the blower motor speed is increased back to the medium speed (Run MEDIUM speed), by removing power from the low speed tap and instead supplying power to the Medium-Speed tap. The unit operates at this speed until the unit cycles off. No information is saved when the unit cycles off and when the unit cycles back on, all comparisons are started all over again.

Alternatively, if the absolute value of the difference between the newly recorded temperature (CURR_TEMP) and the previous temperature (PREV_TEMP) (obtained at the medium speed) is less than a predetermined amount (TEMP_DELTA), then the blower motor speed remains at the low blower motor speed (Run Low Speed) as shown in FIG. 2. The unit operates at this speed until the unit cycles off. No information is saved when the unit cycles off and when the unit cycles back on, all comparisons tests are started all over again. A run timer can be used and if the unit should operate longer than DELAY_STEADY without cycling off by the thermostat controlling the unit, then the comparison tests are repeated. The temperature difference (TEMP_DELTA) can be anywhere from 0.0 degree Fahrenheit to 10 degrees Fahrenheit, but our currently preferred embodiment uses a 3-degree Fahrenheit difference. The time delay (DELAY_RUN) can be anywhere from 30 seconds to 10 minutes, but our currently preferred embodiment uses a 2-minute delay. The DELAY_STEADY can be anywhere between 6 minutes and 24 hours, but our currently preferred embodiment uses 3 hours. The time delays (DELAY_RUN and DELAY_STEADY) and temperature difference (TEMP_DELTA) can be permanently stored in the control logic programming, requiring only a single number, namely PREV_TEMP which can be temporally stored in memory only during powered operation. With this embodiment, no information needs to be stored when the control board is not being powered from the cooling blower power leads. In the currently preferred embodiment, upon blower motor startup, via power being supplied to a separate heat power lead (for furnace and similar applications that allow for a different blower speed in a non-vapor-compression heat mode), the control board provides no function.

Our inventive concept is, of course, not limited to systems with three blower speeds. Any number of blower speeds greater than two may be used. This same logic of operating the blower motor initially at the highest possible speed to obtain an accurate relative humidity in the structure, by measuring the relative humidity in the return air stream, then operating the blower motor at the lowest possible setting, when the relative humidity is high, can be applied to control boards and blower motors capable of any number of multiple speeds.

Figure 4:
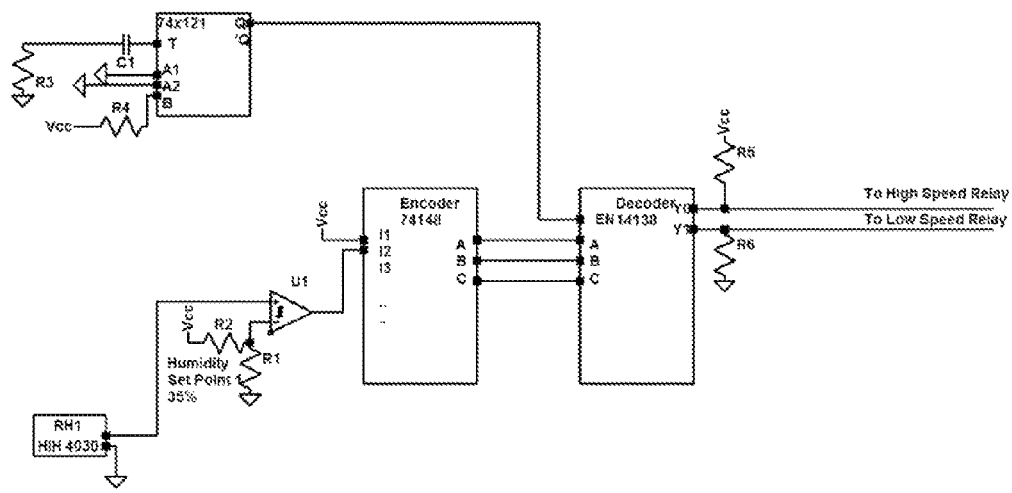
FIG. 4 is a schematic depiction of the a simple embodiment of the two speed humidity control board that does not rely on microprocessor technology.

FIG. 4 displays yet another circuit board configuration to provide humidity control using an analog electronic control board that does not require a microprocessor or programming for blower motor speed adjustment as a function of humidity. In this embodiment, the comparisons are made using multiple analog comparators with the analog output of a humidity sensor. The comparators are then able to convert the signal into a digital system where it is then processed with Boolean logic to determine which speed leg is to be used. This simple approach is shown in FIG. 4, where the humidity sensor to be used in is any 0-5V analog humidity sensor RH1, such as a Honeywell HIH-4030 humidity sensor which outputs a 0-5V signal proportional to the measured humidity. Depending on the number of set points, this signal is then fed into that number of analog comparators which compare the received voltage against another voltage equivalent to a set point as defined by resistors R1, R2. For the HIH-4030 and a set point of 35% humidity, that would correspond to approximately 1.75V, while a 50% humidity set point would correspond to 2.25V. The reference set point voltages may be generated in a variety of methods, though the preferred embodiment is simply a fixed voltage divider circuit from a 5V reference signal. If a set point is to be changed, varying the resistor ratio via a potentiometer will linearly change the set point. After passing through the comparators, the system can be thought of as a digital Boolean logic circuit. The output of the comparators corresponds to a binary number, where a 0 indicates the humidity was below that particular set point, and a 1 indicates the humidity was above the set point. As the humidity rises above the set points, the output of the signals can range from 0000, to 0001, to 0011, to 0111, and so on for as many set points are used. Feeding this into a 74148 encoder will convert the set point voltages into a binary number, from 0, to 1 (00 . . . 01), to 2 (00 . . . 10), to 3 (00 . . . 010), and so on for as many set points as are used. This number is then fed into a 74137 decoder, which takes that input and brings the corresponding output line high. The output lines are then fed into a relay driver circuit. This embodiment simply employs a relay whose coil input is connected to a solid state switch such as a MOSFET that is used to push current through the coil when the MOSFETs input (the output line of the decoder) is high. This is used to handle the case where the logic encoder cannot provide enough current for the relay to switch it on. The output of the relays themselves can then be connected to the speed taps of the blower motor.

To provide for a startup time delay, this simplified embodiment of FIG. 4 uses a 74221 multivibrator (commonly also known as a "one shot") with a large time constant delay equal to DELAY_STEADY; before the multivibrator fires, the control board is configured to provide a high speed output, and after it fires, operation continues as normal. A capacitor in the input stage of the one shot provides for enough of a turn-on time delay to trigger the one shot to transmit a pulse. To handle larger time constants (more than 70 seconds), one may use a cascaded set of one shots to increase the time delay beyond the capabilities of a single chip. Likewise, alternative implementations can include a 555 timer with a counter IC, which may force the 74221 multivibrator to fire when the counter reaches a value equivalent to the desired time, or one may use a stage of logical OR gates to override the relay signals. The one shot output signal can then be connected to the enable lines of the decoder, such that at turn on, pull up and pull down resistors R5, R6 force the high speed tap line to be active. During normal operation, the pull resistors have no effect on the circuit.

Although we have shown and described several embodiments in accordance with the present invention, it should be understood that the same is susceptible of numerous changes and modifications without departing from the spirit of the present invention. Therefore, we do not intend to be limited to the details shown and described herein but intend to cover all such changes and modifications as are encompassed by the scope of the appended claims.

We claim:

1. A method of improving moisture removal capacity during cooling-mode running of a vapor compression system having a fixed-speed compressor, an evaporator and an evaporator blower having a blower motor with a plurality of multi-speed taps each of the taps corresponding to a discrete motor speed, one of which taps corresponds to a highest blower motor speed and another of which taps corresponds to a lowest rotating blower motor speed, consisting of initially running the evaporator blower motor to the highest blower motor speed upon starting the cooling-mode, then measuring a relative humidity in a return air stream while the evaporator blower motor continues operating at the highest blower motor speed, detecting if the measured relative humidity is above a predetermined relative humidity threshold value, and thereupon reducing the evaporator blower motor speed from the initially set highest blower motor speed to the lowest rotating blower motor speed, only when the measured relative humidity is detected to be above the predetermined relative humidity threshold value.

2. The method according to claim 1, wherein the predetermined relative humidity is between 25 and 99 percent.

3. A device for improving moisture removing capacity during a cooling mode of a vapor-compression system having a fixed-speed compressor, an evaporator and an associated evaporator blower having a motor with a plurality of multi-speed taps, each of the taps corresponding to a discrete motor speed, and one of which taps corresponds to a highest blower motor speed and another of which corresponds to a lowest rotating blower motor speed, consisting of a retrofittable control board, and connectors for operatively associating the control board with the evaporator blower motor, the control board comprising circuitry configured to start at the highest blower motor speed at the beginning of each cooling mode cycle, and thereafter, when for a time period during each cooling mode cycle the measured relative humidity is above a predetermined relative humidity threshold value, to operate the blower motor at the lowest rotating blower motor speed throughout a remainder of each such cooling mode cycle in which the measured relative humidity is above a predetermined relative humidity value.

4. The device according to claim 3, wherein the predetermined relative humidity is a relative humidity between 25 and 99 percent.

* * * * *